(12) United States Patent
Neet et al.

(10) Patent No.: US 10,541,581 B2
(45) Date of Patent: Jan. 21, 2020

(54) ALTERNATOR HAVING AN EXTERNAL IGNITION PROTECTION SYSTEM

(71) Applicant: BorgWarner Inc., Auburn Hills, MI (US)

(72) Inventors: Kirk E. Neet, Pendleton, IN (US); George Chen, Jingzhou (CN); Mark Teng, Yichang (CN); Yijun Wang, Jingzhou (CN)

(73) Assignee: BORGWARNER INC., Auburn Hills, MI (US)

( * ) Notice: Subject to any disclaimer, the term of this patent is extended or adjusted under 35 U.S.C. 154(b) by 402 days.

(21) Appl. No.: 15/400,501

(22) Filed: Jan. 6, 2017

(65) Prior Publication Data

US 2018/0183293 A1 Jun. 28, 2018

(30) Foreign Application Priority Data

Dec. 22, 2016 (CN) .......................... 2016 1 1199114

(51) Int. Cl.
| | |
|---|---|
| *H02K 5/10* | (2006.01) |
| *H02K 9/02* | (2006.01) |
| *H02K 5/20* | (2006.01) |
| *H02K 5/14* | (2006.01) |
| *H02K 7/108* | (2006.01) |
| *H02K 11/00* | (2016.01) |

(Continued)

(52) U.S. Cl.
CPC .................. *H02K 5/10* (2013.01); *H02K 5/14* (2013.01); *H02K 5/20* (2013.01); *H02K 7/108* (2013.01); *H02K 9/02* (2013.01); *H02K 11/0094* (2013.01); *H01R 39/08* (2013.01); *H01R 39/36* (2013.01); *H01R 43/10* (2013.01); *H02K 13/00* (2013.01); *H02K 13/003* (2013.01); *H02K 13/02* (2013.01)

(58) Field of Classification Search
CPC .... H02K 11/0094; H02K 19/365; H02K 5/10; H02K 5/136; H02K 5/14; H02K 5/141; H02K 5/20; H02K 7/08; H02K 9/02; H02K 9/06; H02K 9/28; H02K 13/00; H02K 13/003; H02K 13/02; H01R 39/08–36; H01R 43/10
USPC ................................ 310/128, 143, 147, 232
See application file for complete search history.

(56) References Cited

U.S. PATENT DOCUMENTS 5,998,891 A * 12/1999 Chen ...................... H02K 5/141
310/68 D
6,515,398 B1 * 2/2003 Fudono .................. H02K 5/141
310/239

(Continued)

*Primary Examiner* — Nguyen Tran
*Assistant Examiner* — Demetries A Gibson
(74) *Attorney, Agent, or Firm* — Cantor Colburn LLP (57) ABSTRACT

An alternator includes an external ignition protection system including a shaft rotatable about an axis. The shaft includes a slip ring end. A slip ring support is mounted at the slip ring end of the shaft. A slip ring cover is mounted to the shaft. The slip ring cover defines a slip ring cavity. A first slip ring end housing supports the slip ring cover. The first slip ring end housing includes a first plurality of openings. A second slip ring end housing is arranged axially outwardly of the slip ring end. The second slip ring end housing includes a second plurality of openings. The first slip ring end housing, slip ring cover and the second slip ring end housing define a labyrinth flow path that provides an air flow through the slip ring cavity and prevents passage of ignition inducing elements from the alternator.

20 Claims, 8 Drawing Sheets

(51) Int. Cl.
*H01R 39/36* (2006.01)
*H02K 13/00* (2006.01)
*H01R 39/08* (2006.01)
*H02K 13/02* (2006.01)
*H01R 43/10* (2006.01)

(56) References Cited

U.S. PATENT DOCUMENTS

| | | | |
|---|---|---|---|
| 2011/0043083 A1* | 2/2011 | Hamada | F16H 55/36 310/75 R |
| 2014/0145526 A1* | 5/2014 | Shirakata | H02K 5/10 310/52 |
| 2017/0179796 A1* | 6/2017 | Isogai | H02K 11/33 |
| 2017/0324306 A1* | 11/2017 | Akiyoshi | H02K 9/06 |
| 2018/0233994 A1* | 8/2018 | Shirai | H01R 39/12 |

* cited by examiner

ALTERNATOR HAVING AN EXTERNAL IGNITION PROTECTION SYSTEM

CROSS-REFERENCE TO RELATED APPLICATIONS

The present application claims priority to Chinese Patent Application No. 201611199114.9, filed on Dec. 22, 2016, the contents of which are incorporated by reference herein in its entirety.

BACKGROUND OF THE INVENTION

Exemplary embodiments pertain to the art of electric machines and, more particularly, to an alternator including an external ignition protection system.

Alternators typically include a housing that surrounds a field coil, a rotor, and a set of brushes that ride on a slip ring connected to the field coil. Electrical energy generated in the field coil is passed to the rotating slip rings, through the brushes to a voltage regulator. The electrical energy may then be passed to a battery for charging purposes. In marine applications, it is desirable to prevent any external ignitions. More specifically, sparks, that may be generated at an interface of the slip rings and brushes should be maintained in the housing. In marine applications, alternators are routinely positioned in an environment that may contain flammable vapors. Therefore, external ignition prevention is a requirement for alternators that are employed in marine applications.

BRIEF DESCRIPTION OF THE INVENTION

Disclosed is an alternator including an external ignition protection system including a shaft rotatable about an axis. The shaft includes a slip ring end. A slip ring support is mounted at the slip ring end of the shaft. At least two slip rings are mounted to the slip ring support. A slip ring cover is mounted to the shaft over the at least two slip rings. The slip ring cover defines a slip ring cavity. A first slip ring end housing is arranged axially inwardly of the slip ring end and supports the slip ring cover. The first slip ring end housing includes a first plurality of openings. A second slip ring end housing is arranged axially outwardly of the slip ring end. The second slip ring end housing includes a second plurality of openings. The first slip ring end housing, slip ring cover and the second slip ring end housing define a labyrinth flow path that provides an air flow through the slip ring cavity and prevents passage of ignition inducing elements from the alternator.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
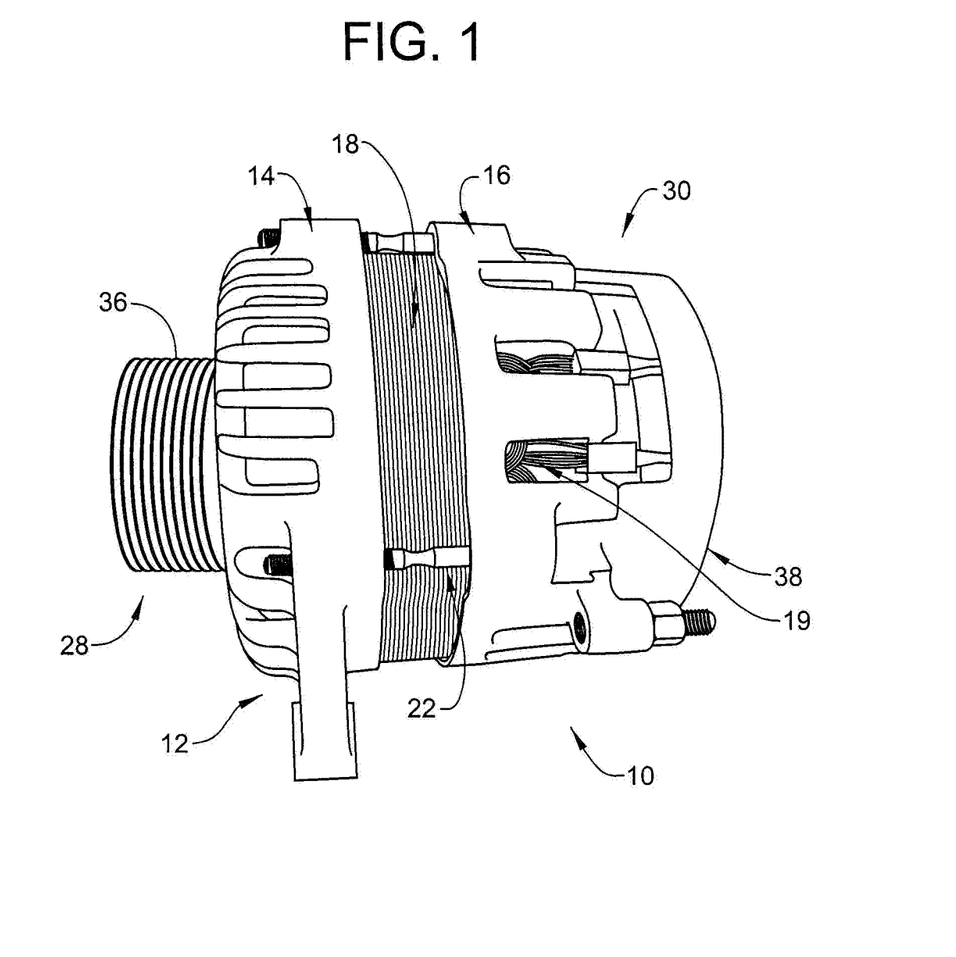
FIG. 1 depicts an alternator, in accordance with an exemplary embodiment.

An alternator, in accordance with an exemplary embodiment, is indicated generally at 10 in FIG. 1. Alternator 10 is configured for marine or maritime operation as will be detailed below. Alternator 10 includes a housing 12 having a first housing portion 14 and a second housing portion 16. First and second housing portions 14 and 16 cover, at least in part, opposing ends (not separately labeled) of a field coil 18 that supports one or more windings 19. A plurality of mechanical fasteners, one of which is indicated at 22 join first and second housing portions 14 and 16 sandwiching field coil 18 therebetween.

Figure 2:
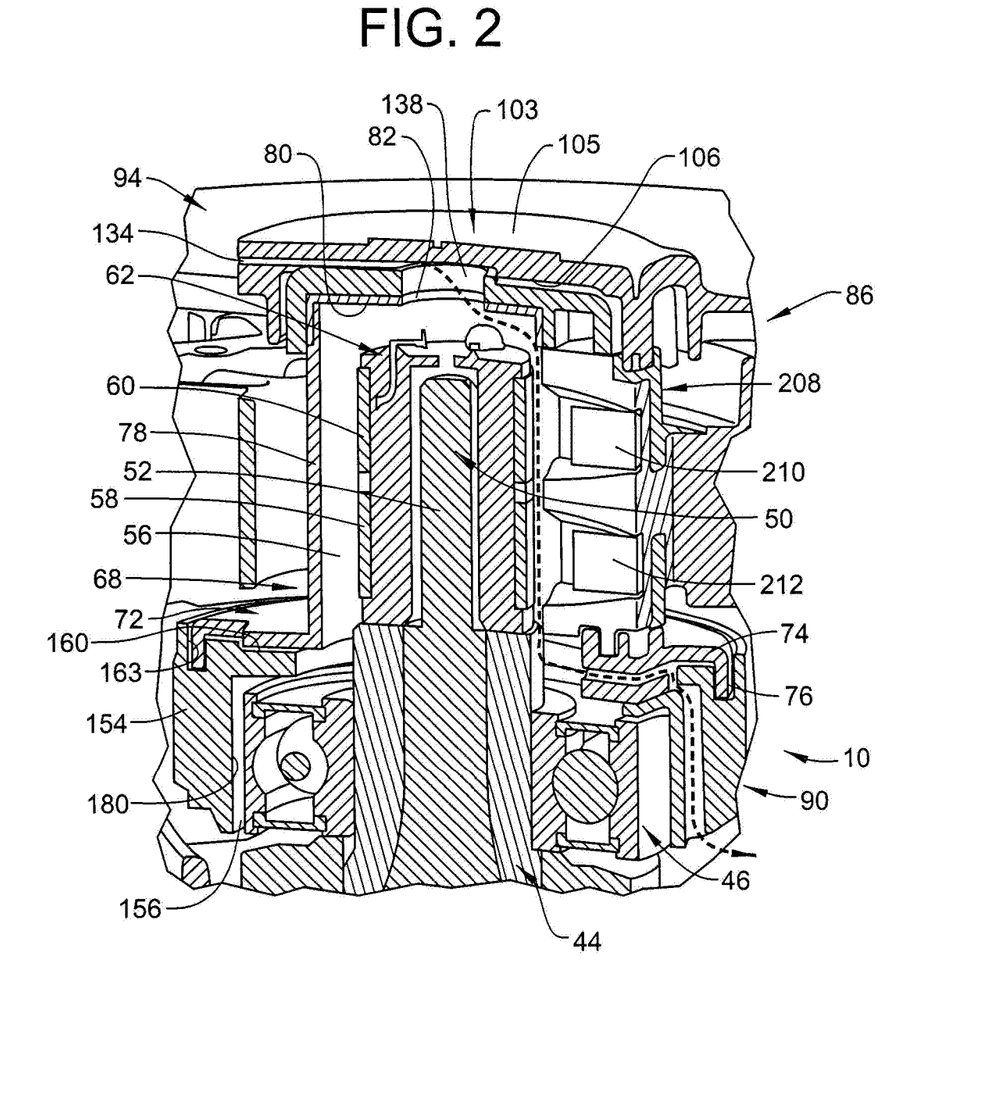
FIG. 2 depicts a partially cut-away view of the alternator of FIG. 1, in accordance with an exemplary embodiment.

Alternator 10 includes a driven end 28 and a load or output end 30. Driven end 28 includes a pulley 36 that may be driven by a belt (not shown) associated with a prime mover, such as an engine (also not shown). Output end 30 includes a cover 38 that shields various electrical connections that may carry developed energy to a battery (not shown). Pulley 36 is supported on a shaft 44 which, in turn, is supported by one or more bearings 46 as shown in FIG. 2. Shaft 44 includes a driven end (not shown) and a slip ring end 50 and supports a rotor (not shown) that is rotated relative to windings 19 to develop electrical energy.

As shown in FIG. 2, slip ring end 50 includes a reduced diameter portion 52 having a slip ring support 56. A first slip ring 58 is mounted to slip ring support 56. A second slip ring 60 is mounted to slip ring support 56 axially spaced from first slip ring 58. First and second conductors indicated generally at 62 extend along shaft 44 and connect to corresponding ones of first and second slip rings 58 and 60. Conductors 62 carry the electrical energy from the rotor to first and second slip rings 58 and 60. A slip ring cover 68 is provided on slip ring end 50 of shaft 44. Slip ring cover 68 includes a base portion 72 having a radially outwardly projecting portion 74 and an axially extending portion 76. A housing wall 78 extends from base portion 72 and surrounds slip ring end 50 as well as first and second slip rings 58 and 60. Slip ring cover 68 includes an axial end portion 80 provided on housing wall 78. Axial end portion 80 includes a slip ring cover opening 82 which, as will be discussed below, defines an air inlet (not separately labeled).

In accordance with an aspect of an exemplary embodiment, alternator 10 includes an external ignition protection (EIP) system 86 that prevents sources of ignition that may occur at or about first and second slip rings 58 and 60 from being exposed to a flammable fluid, such a fuel vapors, that may exist about housing 12. EIP system 86 includes a first slip ring end housing 90 covering, in part, bearing 46 and a second slip ring end housing 94 arranged at slip ring end 50 of shaft 44.

Figure 3:
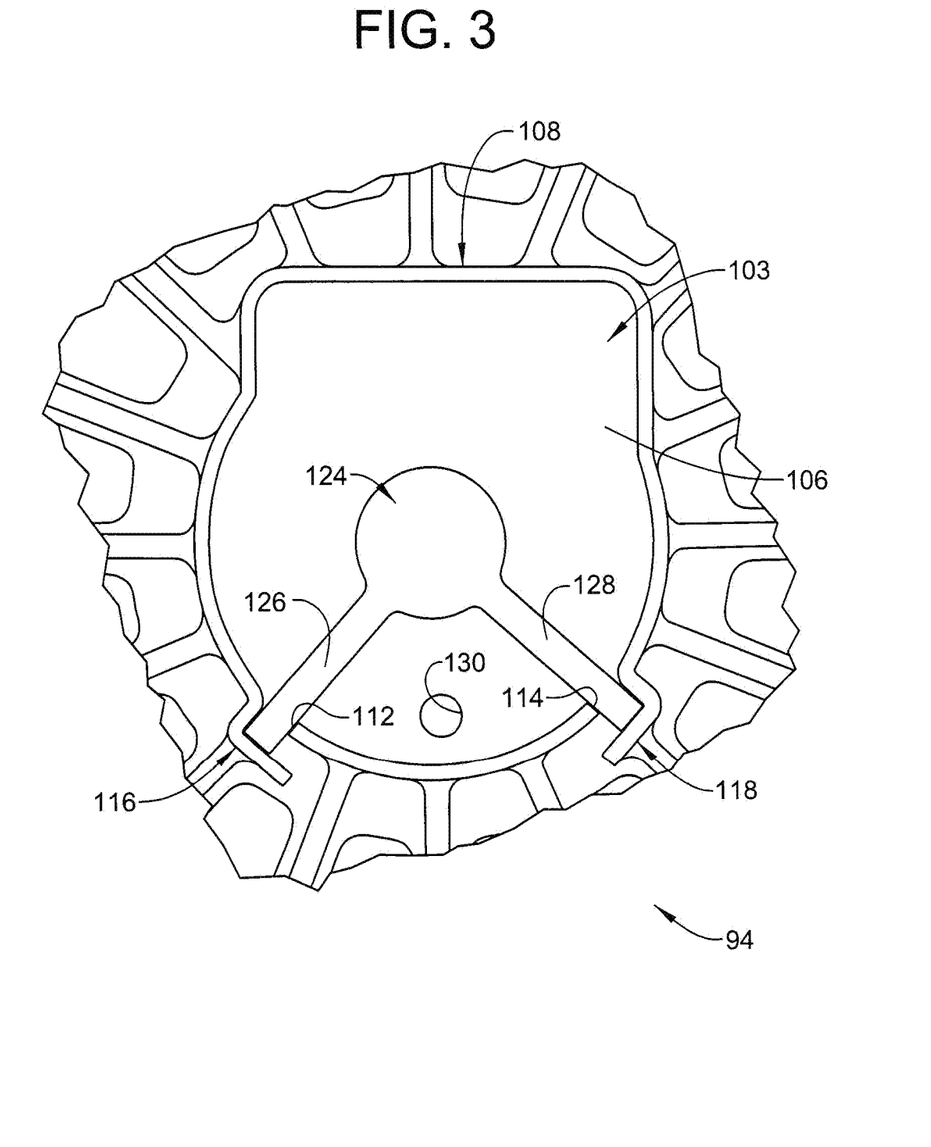
FIG. 3 depicts an inner surface of a first slip ring end housing, in accordance with an aspect of an exemplary embodiment.

Referring to FIG. 3, second slip ring end housing 94 includes a central housing portion 103 having an outer surface 105 (FIG. 2) and an inner surface 106 including a peripheral wall 108. A first opening 112 is formed in peripheral wall 108. First opening 112 defines a first fluid inlet (not separately labeled). A second opening 114 is formed in peripheral wall 108 spaced from first opening 112 and defines a second fluid inlet (also not separately labeled). First and second openings 112 and 114 are positioned along an axis defined by shaft 44 and are directed toward a direction of gravity to promote a desired fluid flow. A first deflector member 116 extends from peripheral wall 108 across first opening 112, and a second deflector member 118 extends from peripheral wall 108 across second opening 114. First and second deflector members 116 and 118 redirect a fluid flow passing into respective ones of first and second openings 112 and 114.

Figure 4:
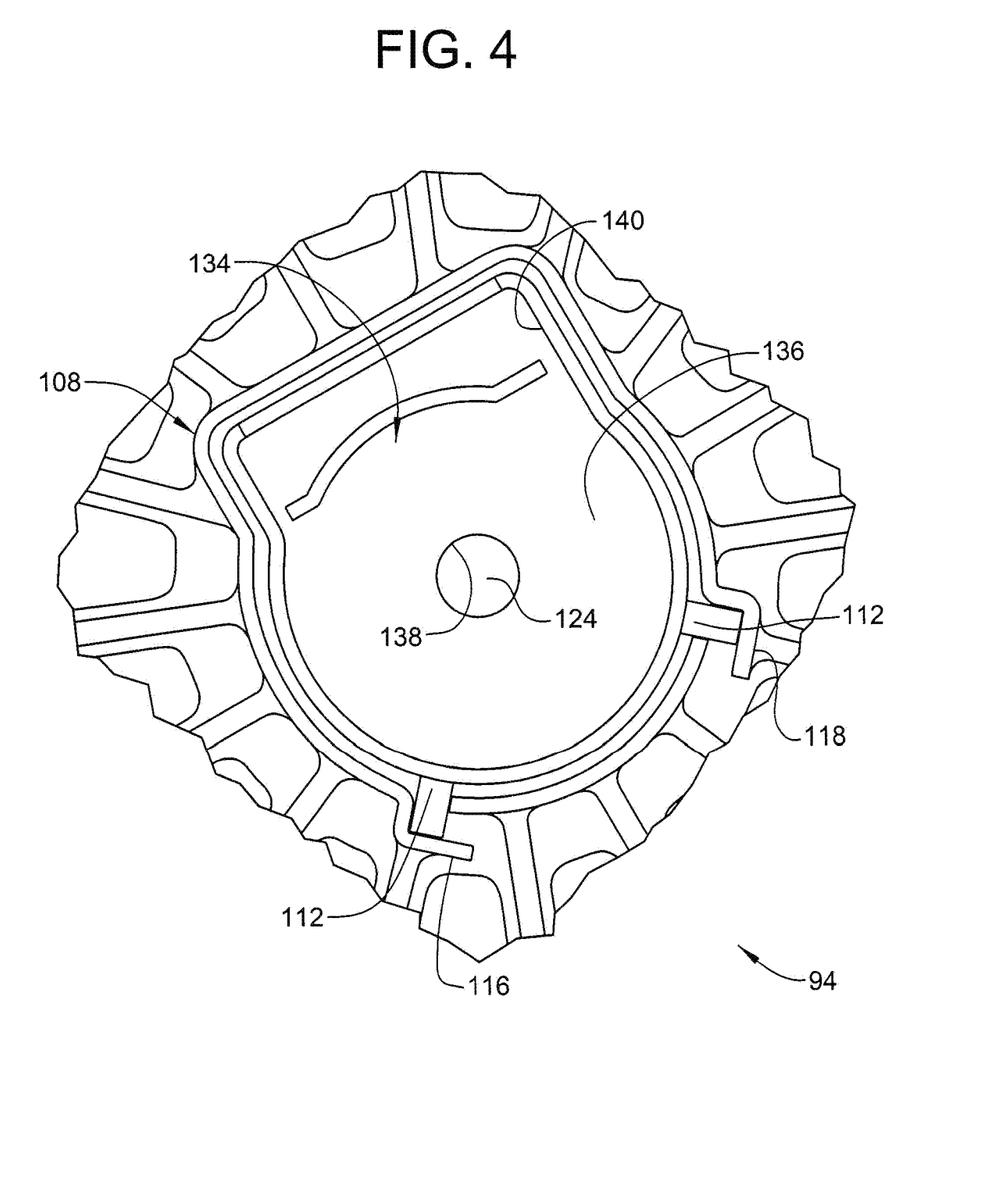
FIG. 4 depicts a cover member installed in the first slip ring end housing of FIG. 3, in accordance with an aspect of an exemplary embodiment.
Figure 5:
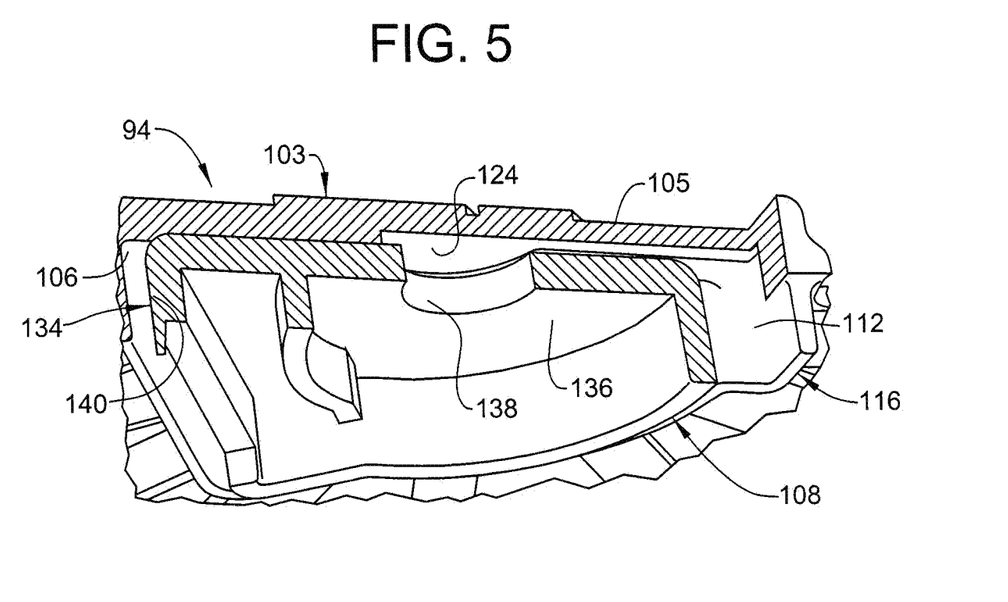
FIG. 5 depicts a cross-sectional side view of the first slip ring end housing of FIG. 3, in accordance with an aspect of an exemplary embodiment.
Figure 6:
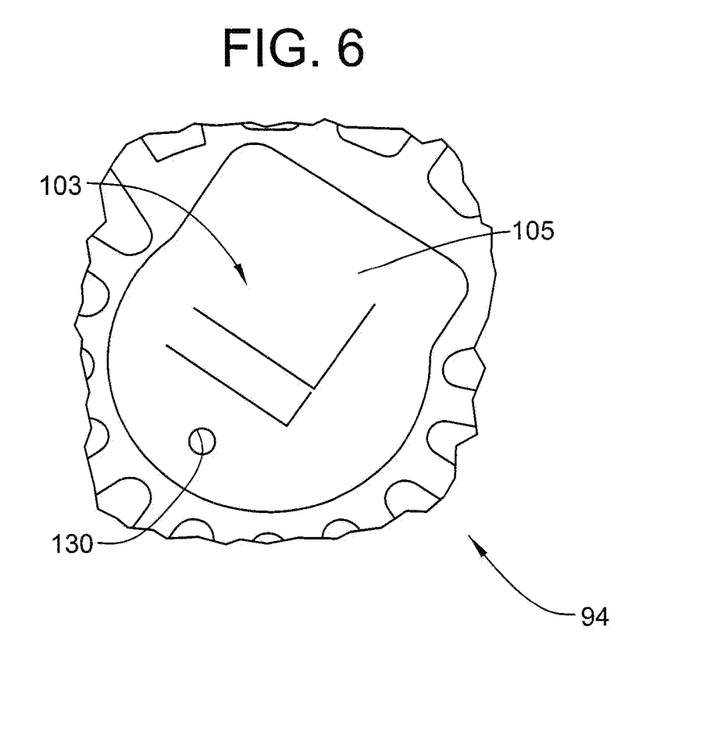
FIG. 6 depicts an outer surface of the first slip ring end housing of FIG. 3, in accordance with an aspect of an exemplary embodiment.
Figure 7:
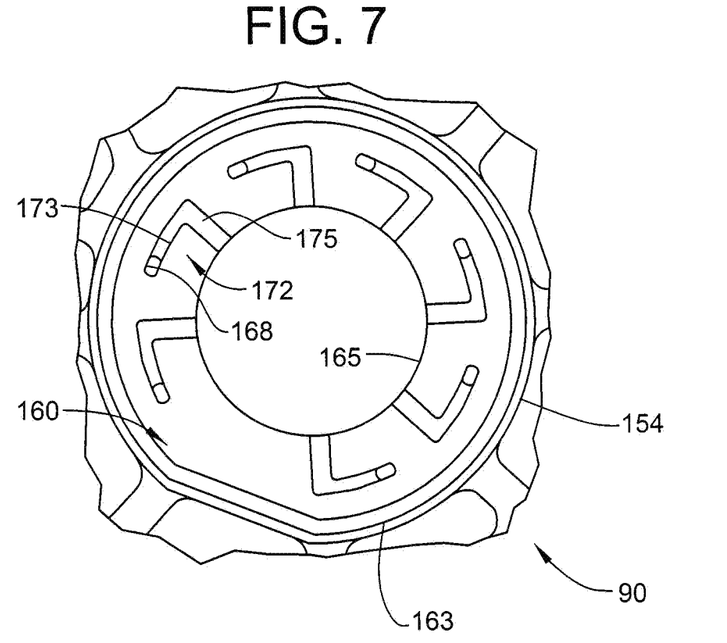
FIG. 7 depicts a first surface of a second slip ring end housing, in accordance with an aspect of an exemplary embodiment.
Figure 8:
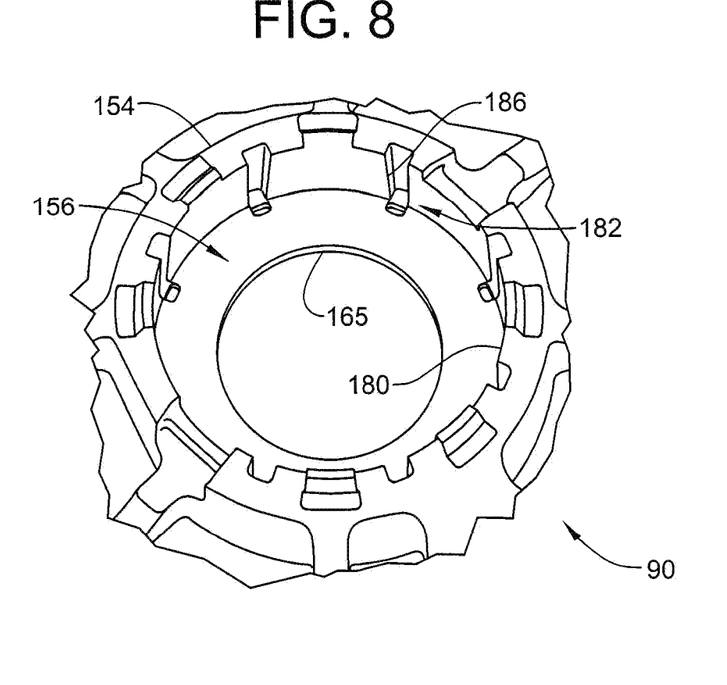
FIG. 8 depicts a second, opposing surface of the slip ring end housing of FIG. 7 showing a first insert, in accordance with an aspect of an exemplary embodiment.

Second slip ring end housing 94 includes a central recess 124 formed in inner surface 106. A first groove 126 is formed in inner surface 106 and extends from central recess 124 to first opening 112. A second groove 128 is formed in inner surface 106 and extends from central recess 124 to second opening 114. It is to be understood that the number of openings, deflector members, and grooves may vary. Additionally, it is to be understood that second slip ring end housing 94 may include an inspection opening 130 that enables fabricators to visually inspect for installation of a cover member 134 shown in FIG. 4. Cover member 134 may nest within peripheral wall 108 and be formed from an elastomeric material and may possess a high-visibility color to facilitate easy recognition through inspection opening 130. Cover member 134 includes a central portion 136 including a cover member opening 138 and a wall portion 140. Cover member opening 138 may register with slip ring cover opening 82 in slip ring cover 68. In this manner, fluid, such as air, entering first and second openings 112 and 114 formed in second slip ring end housing 94 may pass through cover member opening 138 in cover member 134, be constrained by wall portion 140 and flow into slip ring cover 68 to enter slip ring cavity 84.

Referring to FIGS. 7-10, first slip ring end housing 90 includes an axially extending peripheral side wall portion 154 that defines, in part, a bearing receiving zone 156 that receives bearing 46. First slip ring end housing 90 also includes a slip ring cover support surface 160 that extends radially inwardly from axially extending peripheral side wall portion 154. Slip ring cover support surface 160 includes a continuous substantially annular groove 163 that is receptive to axially extending portion 76 of slip ring cover 68 and central shaft receiving opening 165 through which passes shaft 44. It is to be understood that the particular shape of continuous substantially annular groove 163 may vary. The term "substantially annular" should be understood to mean that one or more portions of groove 163 may include straight segments.

First slip ring end housing 90 includes a plurality of openings 168 that extend through slip ring cover support surface 160. Openings 168 may be positioned between continuous substantially annular groove 163 and central shaft receiving opening 165 and be fluidically exposed to slip ring cavity 84. A plurality of grooves, one of which is indicated at 172 are formed in slip ring cover support surface 160 and extend radially inwardly from corresponding ones of the plurality of openings 168 toward central shaft receiving opening 165. Each of the plurality of grooves 172 includes a first groove segment 173 that extends from the corresponding one of the plurality of openings 168 and a second groove segment 175 that extends at an angle from first groove segment 173 toward central shaft receiving opening 165. It is to be understood that the angle may represent a substantially perpendicular angle. The term "substantially perpendicular" should be understood to describe an angle of 90°±12°.

Axially extending peripheral side wall portion 154 includes an inner surface portion 180 having formed therein a plurality of notches, one of which is indicated at 182 that register with corresponding ones of the plurality of openings 168. A first insert 184 (FIG. 9) is arranged in bearing receiving zone 156 and abuts inner surface portion 180. In this manner, notches 182 form passages 186 bounded by inner surface portion 180 and an outer annular surface (not separately labeled) of first insert 184. Passages 186 direct the airflow axially along axially extending peripheral side wall portion 154 to ambient. EIP system 86 establishes a labyrinth flow path from first and second openings 112 and 114 in second slip ring end housing 94, into slip ring cavity 84, along first and second slip rings 58 and 60 to provide cooling, and then out through second slip ring end housing 94. The labyrinth flow path ensures that sources of ignition that may occur at or about first and second slip rings 58 and 60 do not pass to ambient to interact with a flammable vapor that may exist externally of alternator 10.

Figure 9:
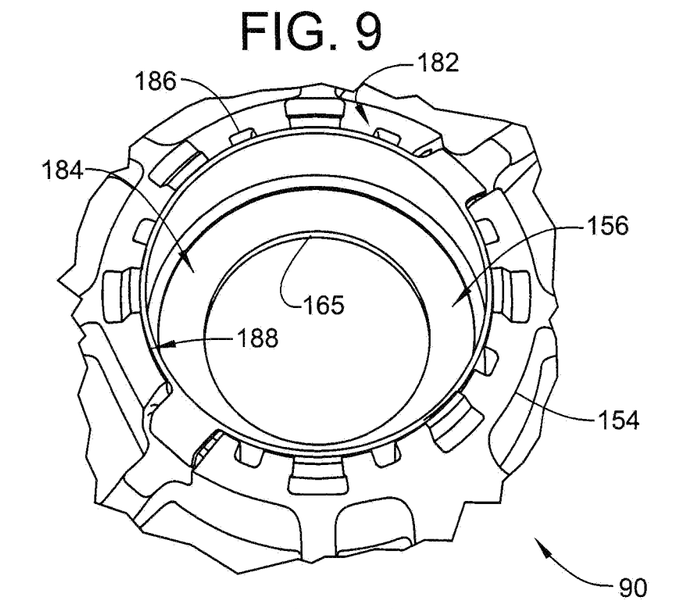
FIG. 9 depicts the second slip ring end housing of FIG. 8 showing a second insert installed with the first insert, in accordance with an aspect of an exemplary embodiment.
Figure 10:
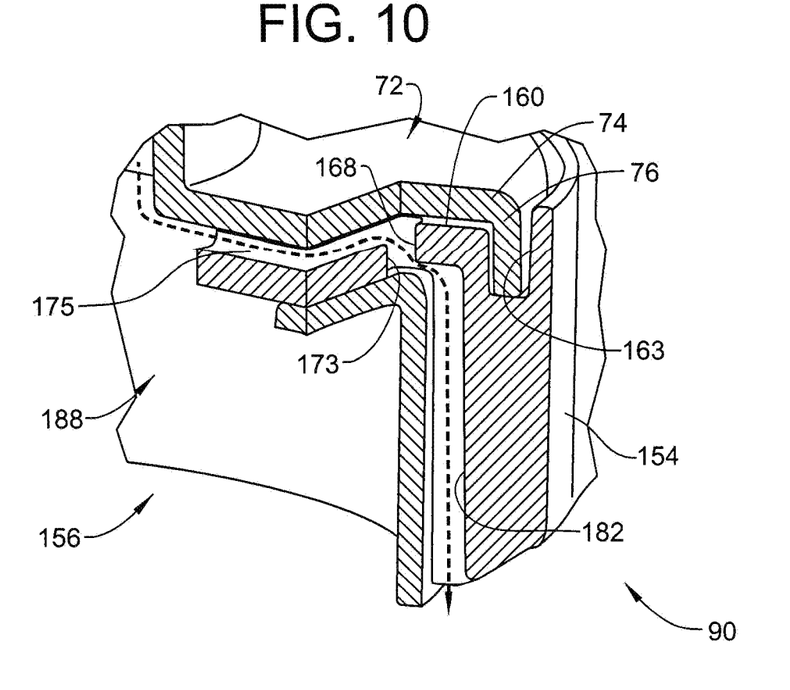
FIG. 10 depicts a partial cross-sectional view of the second slip ring end housing, in accordance with an aspect of an exemplary embodiment.

A second insert 188 is arranged within first insert 184. Second insert 188 may be formed from a material responsive to thermal changes in order to accommodate dimensional changes of bearing 46. It is to be understood that an alternative construction may form first insert 184 from a material responsive to thermal changes or a composite material that may accommodate dimensional changes of bearing 46 without creating undesirable dimensional changes in passages 186 in order to reduce components and simplify manufacturing.

Figure 11:
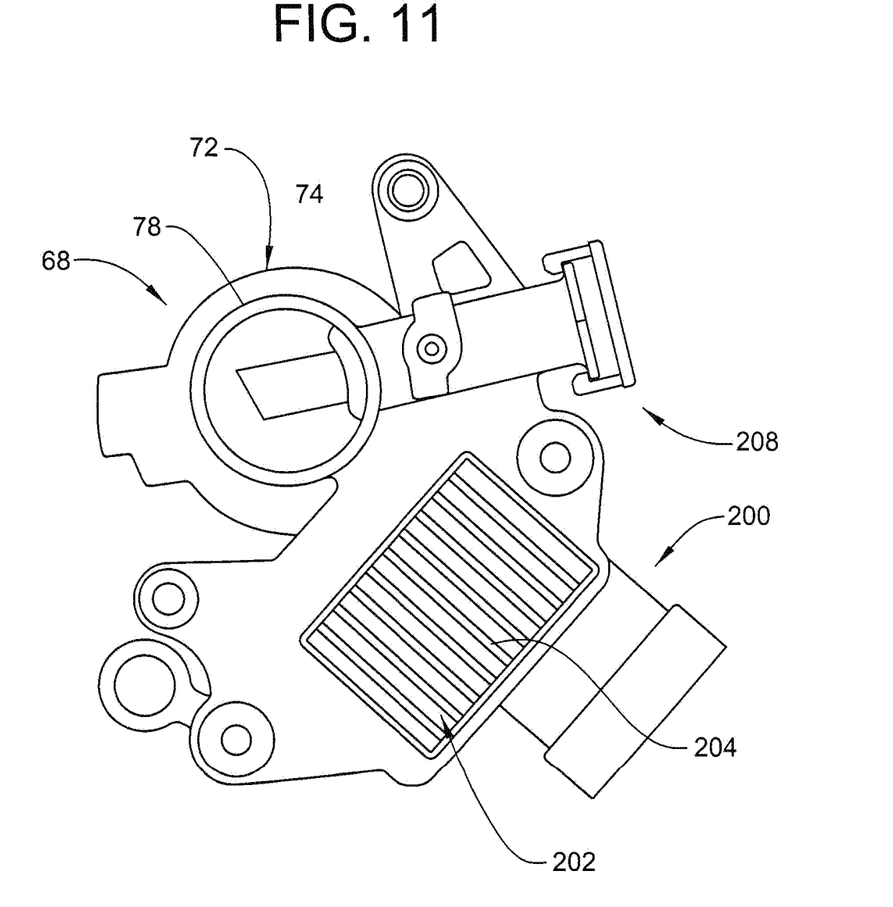
FIG. 11 depicts a voltage regulator, in accordance with an aspect of an exemplary embodiment.

Alternator 10 may also include a voltage regulator support 200 integrally formed with slip ring cover 68. Voltage regulator support 200 provides a platform for a voltage regulator 202 and an associated heat sink 204. A brush housing 208 may be integrally formed with slip ring cover 68 and voltage regulator support 200. Brush housing 208 houses a first brush 210 and a second brush 212 that interact with corresponding ones of first and second slip rings 58 and 60. Brush housing 208 may include a cover member(s) (not shown) that provides for insertion of first and second brushes 210 and 212. By forming slip ring cover 68, voltage regulator support 200 and brush housing 208 from a single unitary member additional leak points for sources of ignition may be avoided and manufacturing may be simplified.

The terms "about" and "substantially", unless otherwise defined, are intended to include a degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An alternator including an external ignition protection system comprising:
   a shaft rotatable about an axis, the shaft including a slip ring end;
   a slip ring support mounted at the slip ring end of the shaft;
   at least two slip rings mounted to the slip ring support;
   a slip ring cover mounted over the at least two slip rings, the slip ring cover including an annular lip and defining a slip ring cavity;
   a first slip ring end housing arranged axially inwardly of the slip ring end defining a slip ring support cover surface which supports the slip ring cover, the first slip ring end housing including a first plurality of openings that extend through the slip ring cover support surface, a plurality of grooves formed on the slip ring cover support surface that extend radially inwardly from the first plurality of openings, wherein the first slip ring housing includes a central shaft opening and an annular groove that is receptive of the annular lip of the slip ring cover, the first plurality of openings being positioned between the central shaft opening and the annular groove; and
   a second slip ring end housing arranged axially outwardly of the slip ring end, the second slip ring end housing including a second plurality of openings, the first slip ring end housing, slip ring cover and the second slip ring end housing defining a labyrinth flow path that provides an air flow through the slip ring cavity and prevents passage of ignition inducing elements from the alternator.

2. The alternator according to claim 1, wherein the second slip ring end housing includes a central housing portion having an inner surface, and a peripheral wall, the second plurality of openings being formed in the peripheral wall.

3. The alternator according to claim 2, wherein the inner surface of the central housing portion includes a plurality of grooves extending radially inwardly from corresponding ones of the second plurality of openings.

4. The alternator according to claim 2, wherein the second slip ring end housing includes a deflector member extending across each of the plurality of second openings, the deflector member changing a direction of air entering the second slip ring end housing.

5. The alternator according to claim 2, wherein the first slip ring end housing includes an peripheral side wall portion defining a bearing housing and a slip ring cover support surface extending radially inwardly from the peripheral side wall portion, the first plurality of openings being formed in the slip ring cover support surface.

6. The alternator according to claim 2, wherein the second plurality of openings are directed toward a direction of gravity.

7. The alternator according to claim 6, wherein the second slip ring end housing includes a deflector member extending across each of the plurality of second openings, the deflector member changing a direction of air entering the second slip ring end housing.

8. The alternator according to claim 1, further comprising: a first insert arranged in the central housing portion extending over the plurality of grooves to form a plurality of passages.

9. The alternator according to claim 8, further comprising: a second insert arranged in the first insert, the second insert formed from a material responsive to thermal expansion of one or more alternator components.

10. The alternator according to claim 1, wherein the slip ring cover includes an axial end portion having an opening fluidically connecting the first and second plurality of openings with the slip ring cavity.

11. The alternator according to claim 10, further comprising: a cover member arranged at the axial end portion of the slip ring cover, the cover member being received by the second slip ring end housing.

12. The alternator according to claim 11, wherein the cover member includes an opening fluidically connecting the second plurality of openings and the slip ring cavity through the slip ring cover.

13. The alternator according to claim 11, wherein the cover member is formed from an elastomeric material.

14. The alternator according to claim 11, wherein the second slip ring end housing includes an inspection opening providing a line of sight to the cover member.

15. The alternator according to claim 1, further comprising: a brush housing supported by the slip ring cover.

16. The alternator according to claim 15, wherein the brush housing is integrally formed with the slip ring cover.

17. The alternator according to claim 15, further comprising: a voltage regulator supported by the slip ring cover.

18. The alternator according to claim 17, wherein the voltage regulator is integrally formed with the slip ring cover.

19. The alternator according to claim 1, further comprising: a bearing supporting the shaft spaced from the slip ring end, the second slip ring end housing extending about the bearing.

20. The alternator according to claim 1, wherein the first plurality of openings defines a fluid outlet and the second plurality of openings defines a fluid inlet.

* * * * *